Figure 2:
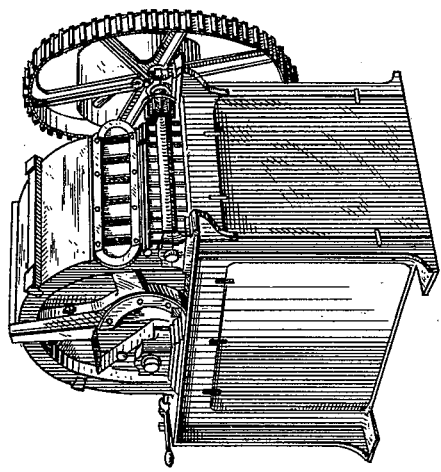

No. 641,934. Patented Jan. 23, 1900.
P. C. D. CASTLE.
PREPARING LOCUST BEANS FOR EXTRACTING GUM.
(Application filed Oct. 12, 1899.)

(No Model.) 3 Sheets—Sheet 1.

Witnesses
Julia M. Pond.
D. E. Burdine.

Inventor:
Peter C. D. Castle,
by Dodge and Sons,
Associate Attys.

No. 641,934. Patented Jan. 23, 1900.
P. C. D. CASTLE.
PREPARING LOCUST BEANS FOR EXTRACTING GUM.
(Application filed Oct. 12, 1899.)
(No Model.) 3 Sheets—Sheet 2.

No. 641,934. Patented Jan. 23, 1900.
P. C. D. CASTLE.
PREPARING LOCUST BEANS FOR EXTRACTING GUM.
(Application filed Oct. 12, 1899.)
(No Model.) 3 Sheets—Sheet 3.
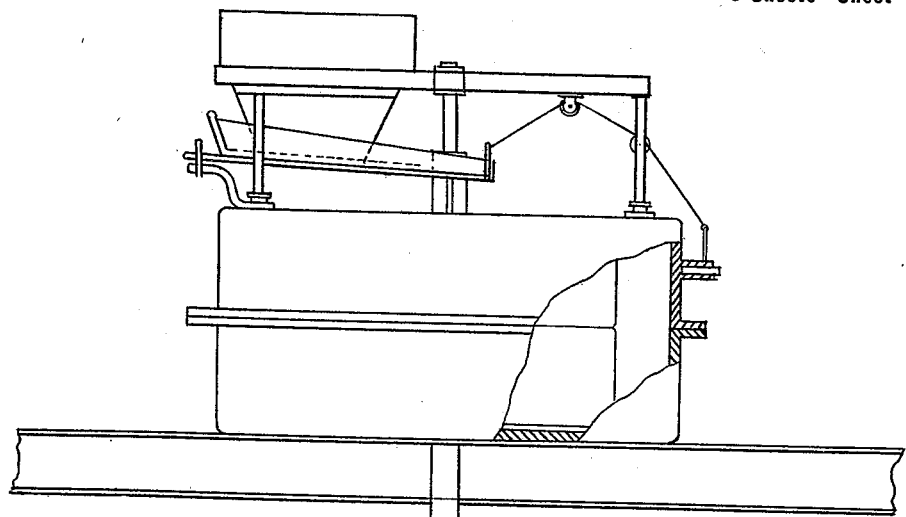
Fig. 4.
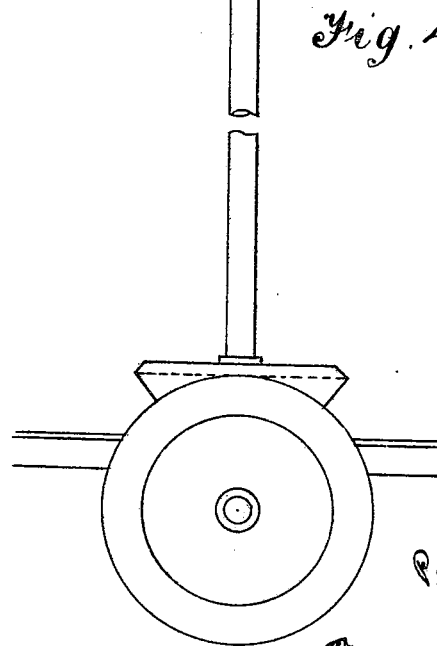
Fig. 5.
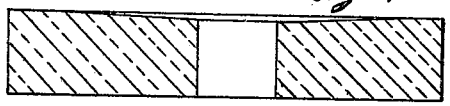
Witnesses
J. B. Malnati
D. E. Burdine
Peter C. D. Castle,
Inventor:
by Dodge and Sons,
Associate Attys.

UNITED STATES PATENT OFFICE.

PETER C. D. CASTLE, OF LIVERPOOL, ENGLAND.

PREPARING LOCUST-BEANS FOR EXTRACTING GUM.

SPECIFICATION forming part of Letters Patent No. 641,934, dated January 23, 1900.

Application filed October 12, 1899. Serial No. 733,400. (No specimens.)

*To all whom it may concern:*

Be it known that I, PETER CAMERON DOUGLAS CASTLE, a subject of the Queen of Great Britain, residing at Liverpool, in the county of Lancaster, England, have invented certain new and useful Improvements in Preparing Locust-Beans for the Extraction of Gum, of which the following is a specification.

This invention has for its object an improved process for shelling the kernels of the locust-bean (*Ceratonia siliqua*) and for preparing them for the extraction of pure gumtragasol.

It has been found impossible to use the ordinary mechanism employed for shelling or conditioning—that is, permeating with moisture or, in some instances, kiln-drying—rice, beans, peas, lentils, and the like, because of the shells or skins of two locust-beans taken from the same pod one of them may be of almost adamantine hardness and not appreciably softened with a given steeping, while the other may be quite soft to start with and be utterly spoiled for my purpose by that steeping. Further, the gummy nature of the cotyledon causes it to become very sticky when conditioned by moisture and still more by heat and moisture, thus causing it to again adhere to the husk even when separated from it. The gum, too, is deteriorated when conditioned by kiln-drying, so as to make the shell brittle. After trying a great number of experiments I have discovered that by combining and slightly modifying several well-known mechanical processes and giving a peculiar cut to the dressing of the millstones I am enabled to separate the husk and germ from the valuable cotyledon with the loss of only a small percentage of the cotyledon, which alone produces the gum. It is necessary to separate both the shell and the germ from the cotyledon, as otherwise the coloring-matter of the shell would spoil the color of the gum produced, and the nitrogenous matter of the germ would cause decomposition to set up very quickly in the gum.

My invention is best described by aid of the accompanying drawings, in which—

Figure 1:
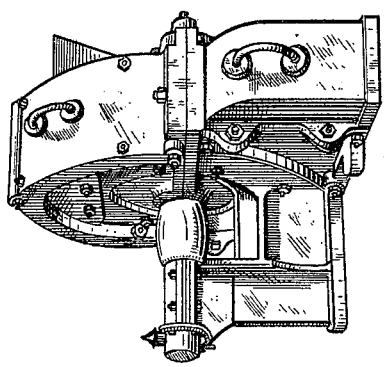
Figure 3:
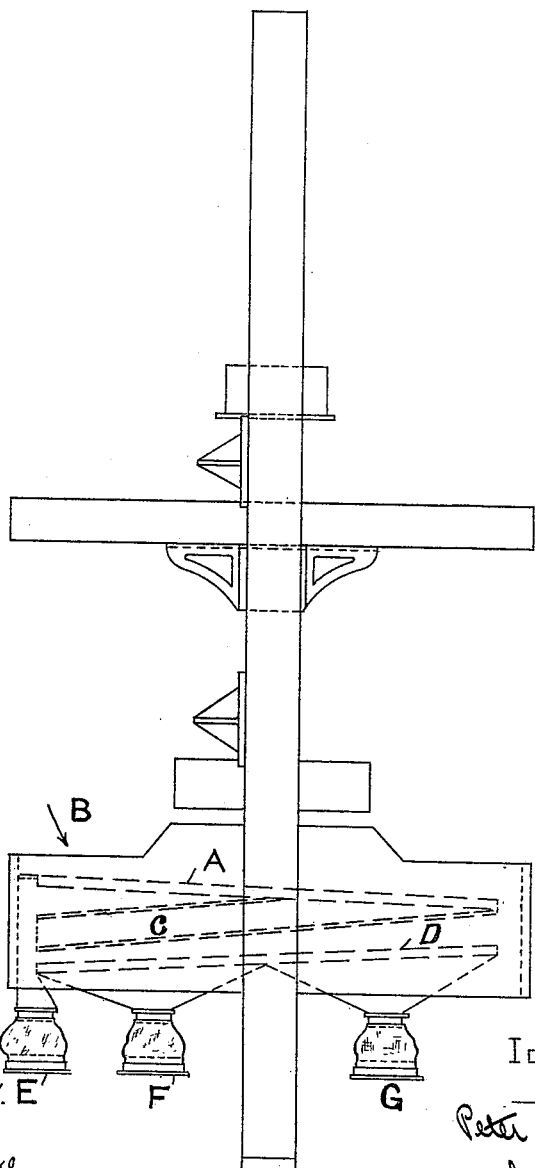

Figure 1 is the well-known Carter disintegrator. Fig. 2 is the almost equally well-known pearling-machine formed of one or a series of abrading-disks running on a horizontal axis inside a casing. The hopper for feeding this casing has been removed to show the disks. Fig. 3 is a grading-machine, also of an ordinary type; and Fig. 4, an ordinary millstone arrangement, the dress of the millstone alone being novel. Fig. 5 is a vertical section of a modification of the lower stone.

In carrying out my process with these four machines the kernels are first passed through the Carter disintegrator. In this the disintegrating-disk revolves at three thousand five hundred revolutions, or thereabout, per minute. The kernels are by this disintegrating-disk split up, and about eighty to eighty-five per cent. of the germ and some portions of the husk are detached. These are separated from the split kernels by sifting. Secondly, the split kernels from the Carter disintegrator are now graded in the machine set forth in Fig. 3, which is more diagrammatic than illustrating an actual machine. In this, A is a sieve onto which the split kernels are shot from a spout placed at the point shown by the arrow B. C is a sloping tray below. D is a second sieve onto which the tailings from the upper sieve fall, where they are again sieved, and finally fall into the bag E, the siftings falling into bags F and G and the tailings from the first sieve being carried away to one side. It is needless to say that sieve D has a different mesh in its lower part to its upper part. This machine divides the kernels into three lots. Each lot is then taken separately and passed through the mill set forth in Fig. 4. This mill is the ordinary old arrangement of millstones of a corn-grinding mill, the only novelty being the cut or dress of stones. These stones can be of French burstone or other variety of hard abrading material. The stones have no alleys or grooves outward from the throttle or eye. Instead of these the upper and lower stones or one of them are or is very slightly beveled from the throttle to within two or three inches of the periphery, as shown in Fig. 5, which is a section of a lower stone. The stones are set only so far apart as to prevent the grinding of the split kernels when passing through the flat circumferential ridge two or three inches wide above mentioned. They are near enough, however, according to the size and thickness of the kernels, to grind off the convex apex of the husk. The result is that the split kernels fed from the throttle are driven by centrifugal speed to the outside ridge, which they can only pass through on the flat, and at this point between the two stones the apex of the husk is shaved off each individual split bean, thereby preparing it for the next operation. It is found that the flat side of the bean has more friction than the apex. Consequently the apex alone is ground, the flat portion remaining clinging to the stone, so that it is very little worn. The partially-husked kernels are now passed into a powerful pearling-machine. (Set forth in Fig. 2.) This machine is the same kind that is now used for pearling barley, but is made much stronger in all its parts than any similar machine now in use. It consists of a horizontal axis having a millstone or series of millstones, emery disks, or other equivalent running thereon and surrounded by a steel-wire-gauze cylinder having an opening for admission of feed near the top and another for discharging the material at the bottom. This stone or stones may be run at a speed of from one hundred to three hundred revolutions per minute, depending upon the diameter of the stones, so as to leave a circumferential speed of about fifteen hundred feet per minute. The outside cylinder is also preferably run at ten to fifteen revolutions a minute by gearing from the main shaft. It is run in the same direction as the stone, and the space between the stone and the cylinder is kept about two-thirds full of the material. This machine if alone used for shelling would wear away a very large portion of the cotyledon before it removed all the husk, and this is the reason why the split kernels first have their apex ground off as aforesaid, and they are kept in this machine until they are only partially husked. From this machine they are again passed to the grader shown in Fig. 3 and then brought back again to the machine or a similar machine and treated in the same manner. By this means a further percentage of the husk is taken off without excising so much of the gum as would have been ground off with the husk if the material had been finished at one operation. From the second machine the kernels are again passed to a grader and from there back again to a pearling-machine to be finished, though sometimes they are required to go through the operation once more. These machines are found to remove the husk sooner from the round outer circle or edge of the split kernel than from its apex. Hence the necessity for first getting rid of the apex of the husk. During these processes the remainder of the germ has been knocked off along with the husk and the entire mass can now be sifted or winnowed to remove any further fine portions of the husk and germ.

I claim as my invention—

1. The process of separating the husk and germ from the cotyledons of locust-beans, which consists in first breaking the locust-bean into two or more portions, secondly, grading the fragments and separating the finer particles therefrom, thirdly, grinding off the apex of the shell on the split kernels, fourthly, abrading off a large further part of the husk by means of rotary motion against abrasive surfaces, and again applying rotary abrasion, and sifting and so on alternately until the kernel and the germ are sufficiently removed.

2. The improvement in the process of separating the husk from the split kernels of the locust-bean which consists in first grinding off the apex of the shell between two approximately flat surfaces, and then grinding off the remainder of the shell by pearling.

3. The improvement in the process of separating the shells and germs of locust-beans from the cotyledons, which consists in cracking the locust-beans, grinding off the protruding apex of the shell, and after that the remainder of the shell, substantially as described.

4. The improvement in the process of separating the shell and the germ from the cotyledons of the locust-bean, which consists in first grinding on the flat, and then pearling, but a little only at a time, and grading between each operation, whereby the detritus is separated as it is broken off, instead of being allowed to react upon the kernel.

In witness whereof I have hereunto signed my name this 9th day of September, 1899, in the presence of two subscribing witnesses.

P. C. D. CASTLE.

Witnesses:
H. P. SHOOBRIDGE,
J. MCLACHLAN.